United States Patent
Geisler et al.

(10) Patent No.: US 8,129,460 B2
(45) Date of Patent: Mar. 6, 2012

(54) METHOD AND SYSTEM FOR PRODUCING A SPINNING SOLUTION FOR PRODUCING A POLYMER FIBER

(75) Inventors: Reinhard Geisler, Schopfheim (DE); Pierre Liechti, Muttenz (CH); Thomas Isenschmid, Magden (CH)

(73) Assignee: List Holding AG, Arisdorf (CH)

( * ) Notice: Subject to any disclaimer, the term of this patent is extended or adjusted under 35 U.S.C. 154(b) by 117 days.

(21) Appl. No.: 12/599,820

(22) PCT Filed: May 14, 2008

(86) PCT No.: PCT/EP2008/003857
§ 371 (c)(1),
(2), (4) Date: Feb. 2, 2010

(87) PCT Pub. No.: WO2008/138597
PCT Pub. Date: Nov. 20, 2008

(65) Prior Publication Data
US 2010/0160525 A1    Jun. 24, 2010

(30) Foreign Application Priority Data
May 14, 2007   (CH) ...................................... 0801/07

(51) Int. Cl.
*C08K 3/30*   (2006.01)
(52) U.S. Cl. ......... 524/422; 422/229; 422/232; 422/233

(58) Field of Classification Search .................. 524/422; 422/229, 232, 233
See application file for complete search history.

(56) References Cited

U.S. PATENT DOCUMENTS

| | | | |
|---|---|---|---|
| 3,873,072 A | 3/1975 | Blackmon | |
| 4,368,615 A | 1/1983 | Lammers | |
| 5,298,028 A * | 3/1994 | Hsu | ................................ 8/130.1 |
| 5,756,031 A | 5/1998 | Tani et al. | |
| 5,882,563 A | 3/1999 | Roelofs et al. | |

FOREIGN PATENT DOCUMENTS

EP   0517068   12/1992

OTHER PUBLICATIONS

Anonymous: "Improved homogeneity of solutions of aromatic polyamides" Aug. 1, 1983, Research Disclosure, Mason Publications, Hampshire, GB, XP007108972 ISSN: 0374-4353.

* cited by examiner

*Primary Examiner* — Peter Szekely
(74) *Attorney, Agent, or Firm* — Bachman & LaPointe, P.C.

(57) ABSTRACT

A method for producing a spinning solution for producing a polymer fiber, particularly a p-aramid fiber, the polymer being blended with a solvent, mixed, melted, homogenized, and degassed and then discharged, liquid sulfuric acid being used as the solvent and at least the mixing, homogenization, and degassing taking place in a preferably continuously operated single or double cell reactor (1).

10 Claims, 3 Drawing Sheets

METHOD AND SYSTEM FOR PRODUCING A SPINNING SOLUTION FOR PRODUCING A POLYMER FIBER

BACKGROUND OF THE INVENTION

This invention relates to a method of producing a spinning solution for producing a polymer fiber, in particular an aramid fiber, which method comprises admixing the polymer with a solvent, and melting, homogenizing, devolatilizing and then discharging the mixture and also to apparatus therefor.

Manufactured polymer fibers are currently needed for many applications in the private and industrial spheres. This applies, for example, to all kinds of garments, reinforcing fabrics, industrial textiles, wear pads, filters, etc. For this purpose, the polymer in question, which is usually present in piece or powder form, is admixed with a solvent, melted, homogenized, devolatilized and then fed while still in the viscous state or remelted after intervening transportation to dies from which it is then extruded under high pressure to form the fiber.

U.S. Pat. No. 5,882,563, for example, discloses a process for making fibers from poly(p-phenyleneterephthalamide) in which sulfuric acid cooled to below its coagulation point is mixed in the form of ice with p-aramid to obtain a solid mixture. Thereafter, this solid mixture is reheated and melted and this liquid is spun through spinning orifices under pressure. The heating of this solid mixture is carried out in two separate zones, namely a melting zone and a pressure build-up zone, with the polymer being kneaded and mixed in the melting zone at least.

The object of the present invention is providing a method and apparatus of the abovementioned type which provides the product with a long residence time while at the same time increasing the shear rates in the apparatus and providing a maximum of flexibility, processing consistency and reduced apparatus components.

SUMMARY OF THE INVENTION

The object is achieved when liquid sulfuric acid is used as solvent and at least the mixing, homogenizing and devolatalizing is effected in a preferably continuously operated single- or twin-shaft reactor.

This eliminates the need for the hitherto necessary cooling of the sulfuric acid to below its coagulation point, making the entire process significantly simpler and less costly.

Hitherto, furthermore, single-shaft reactors have generally been used, but they have a limited shear rate and are also limited in torque absorption. A twin-shaft reactor, for example of the CRP or CKR type from List, as described in EP 0 517 068, however, gives significantly better results, particularly with regard to the residence time of the product in the reactor, the higher volume capacity of the reactor, the free surface area of the product, and the robustness of the system. A feature particularly worth highlighting is that the three process steps, viz., mixing, homogenizing and devolatalizing, take place in a single reactor. It is only the premixing step which may possibly require a separate mixer.

The large surface area of the product results in good devolatilization and intensive surface renewal during kneading.

In twin-shaft kneading machines, the two shafts can be operated at equal or else at different speeds, which makes the shear rate and the mixing of the product significantly better than in a single-shaft reactor. Moreover, there are scarcely any dead zones in a twin-shaft reactor where product deposits might build up and then possibly remain in the reactor and lead to degradation of the product.

A further feature of the present invention relates particularly to the sequence of inputting the liquid sulfuric acid and the polymer powder. It was determined that it is specifically the order of the metered additions that leads to significant improvements. The polymer powder, which is introduced first, can mix significantly more intensively with the sulfuric acid introduced later. The powder constituents are uniformly enveloped by the sulfuric acid.

BRIEF DESCRIPTION OF THE DRAWINGS

Further advantages, features and details of the invention will become apparent from the following description of preferred illustrative embodiments and also with reference to the drawing, which shows in FIG. 1 a schematic, block diagram of the inventive method of producing a spinning solution for producing a polymer fiber, FIG. 2 a schematic, block diagram of a further illustrative embodiment of an inventive method of producing a spinning solution for producing a polymer fiber, FIG. 3 a schematic, block diagram of a further illustrative embodiment of apparatus for producing a spinning solution for producing a polymer fiber.

DETAILED DESCRIPTION

Figure 1:
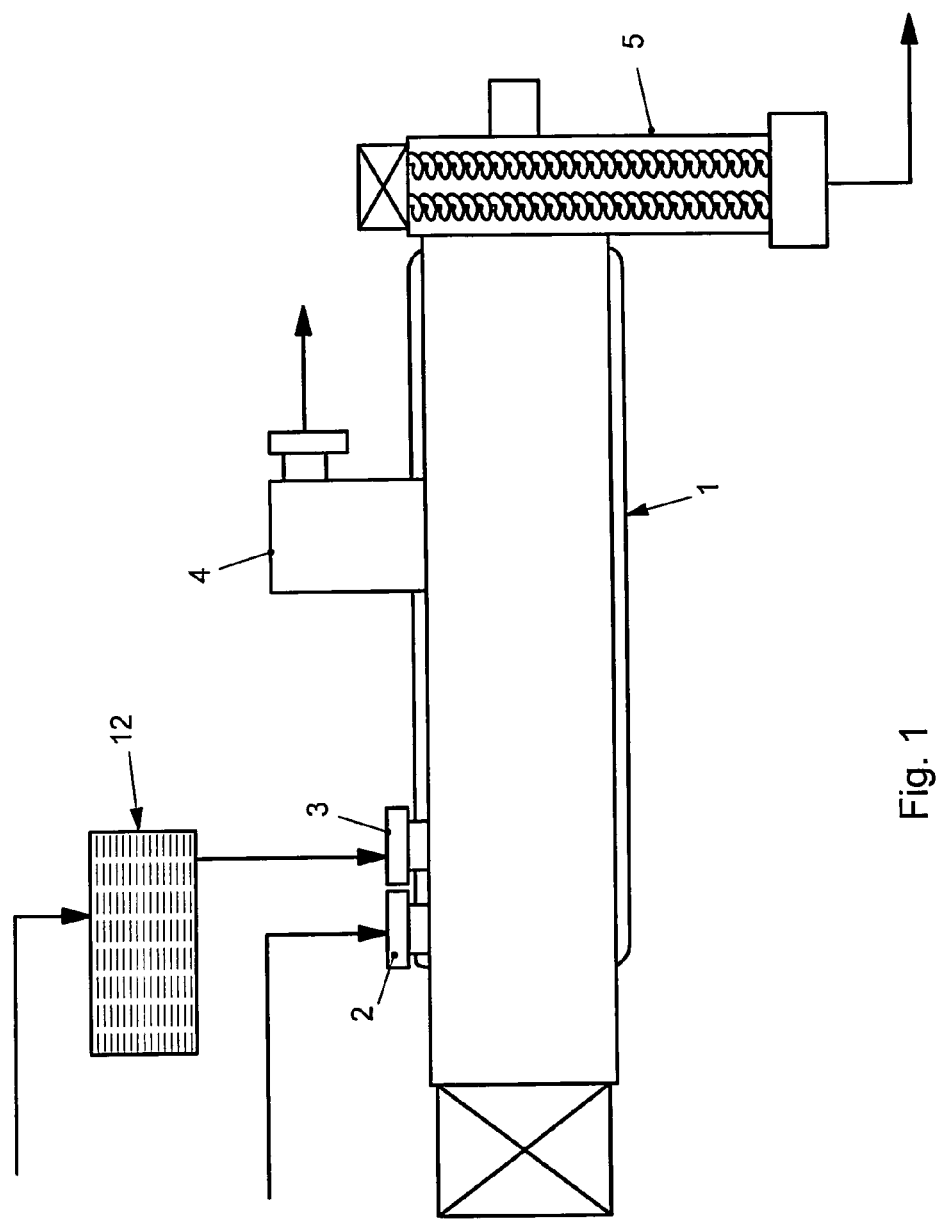

Inventive apparatus for producing a spinning solution for producing a polymer fiber includes centrally a twin-shaft reactor 1 as described in EP 0 517 068 for example. This reactor 1 has two input stubs 2 and 3, with input stub 3 being used for liquid sulfuric acid and input stub 2 for adding the polymer in powder form. The feed line for the solvent may additionally include a precooler 12.

The reactor is additionally fitted on top with a vapor dome 4, via which any gases still present are withdrawn during the mixing and homogenizing of the product in reactor 1.

Reactor 1 connects on its downstream side to a single or twin-shaft discharging device 5 of variable speed of rotation. In the present illustrative embodiment, it takes the form of a twin-shaft discharging device. The mixed product passes out of the reactor 1 through the discharging device to a pump (not specifically illustrated) which then extrudes the mixed product through appropriate dies to form fibers.

Figure 2:
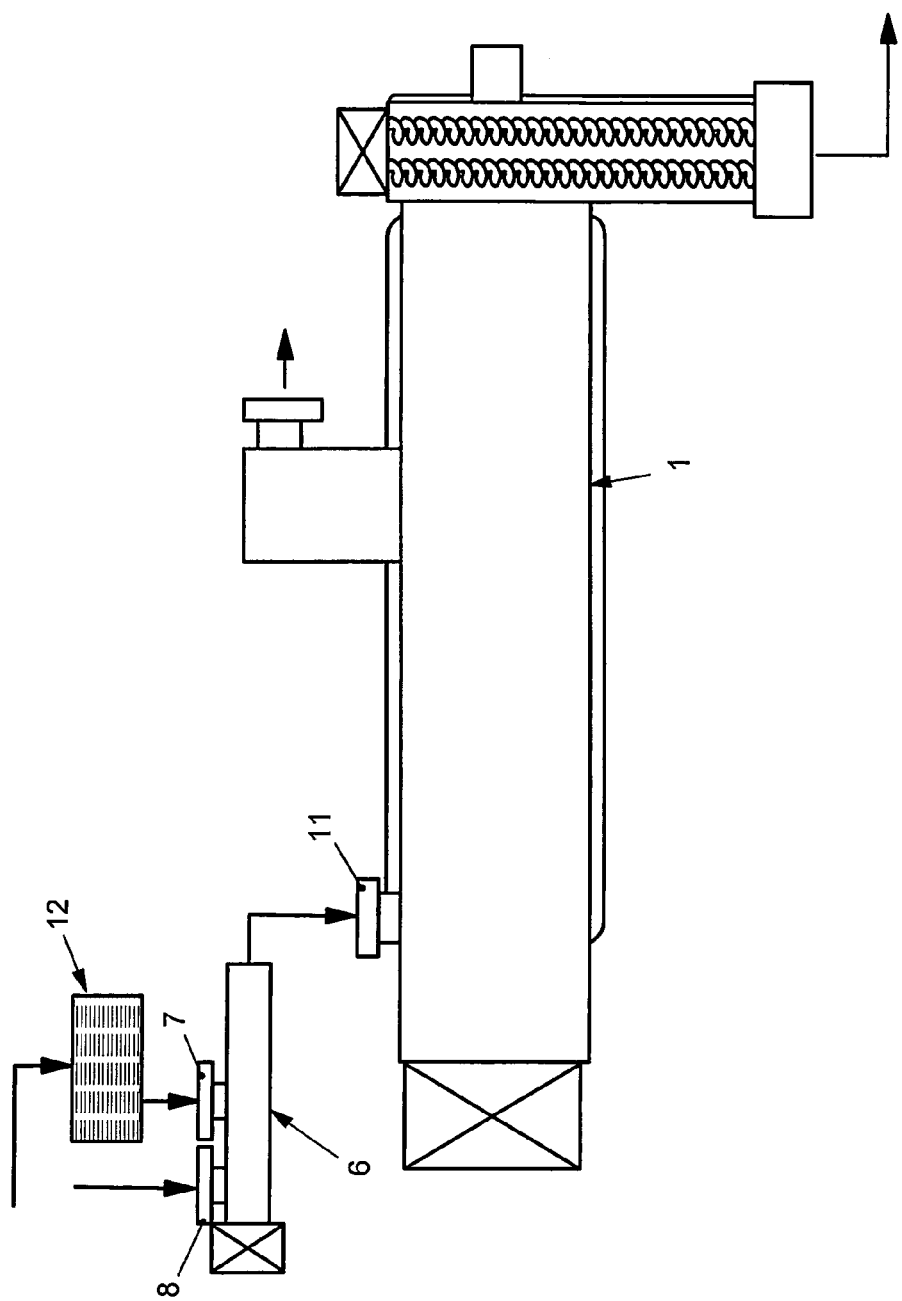

The illustrative embodiment of the inventive apparatus according to FIG. 2 differs from that according to FIG. 1 in that polymer and sulfuric acid are premixed in a mixer 6 upstream of the reactor 1 and then the mixed product is introduced into the reactor 1 in an already premixed state and preferably by metering, through a single input stub 11. The polymer and the sulfuric acid are introduced into the mixer 6 through two metering stubs 7 and 8.

Figure 3:
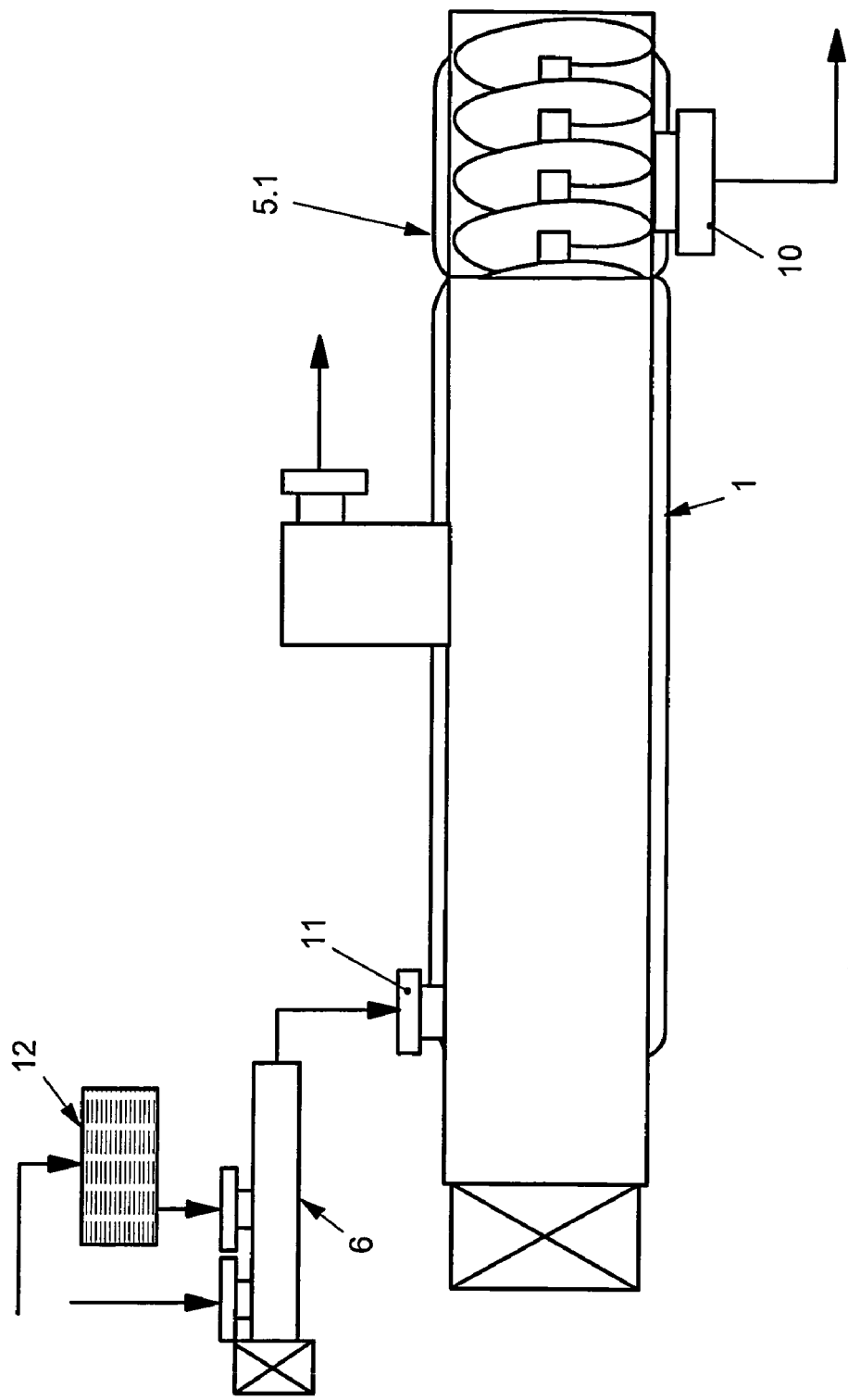

The illustrative embodiment of an inventive apparatus according to FIG. 3 differs from that according to FIG. 2 in that the reactor 1 connects on its downstream side to a single-shaft discharging screw 5.1, whose axle 9 extends axially relative to the reactor 1. This results in a pressure building up between a discharge opening 10 and the interior of the reactor 1, making it possible for the mixed product to be discharged from the reactor 1 continuously.

The mode of functioning of the present invention is as follows:

Referring to the illustrative embodiment shown in FIG. 1, sulfuric acid and polymer powder, in particular p-polyphenyl terephthalamide (PPTA), are introduced in a continuous reactor 1, in particular a mixing kneader from List of the CRP or CKR type, through the input stubs 2 and 3. This reactor has two horizontally disposed shafts fitted with appropriate kneading elements, and not only the outer shaft but also the shafts and optionally the kneading element are heatable.

The polymer powder which comes into intensive contact with the solvent, sulfuric acid in this case, evolves a certain solution enthalpy. This quantity of heat combined with the contact heat transportation quantity through the reactor walls and kneading shafts leads to rapid heating and melting of the mixture.

At the same time, it is transported from the input stubs 2, 3 in the direction of the discharging device 5. During this transport, the mixed product in turn undergoes uniform devolatilization over the entire length of the kneading zone, and the gases are withdrawn through the vapor dome 4. The product thus intimately commixed is then discharged through the discharging device 5.

The illustrative embodiment shown in FIG. 2 comprises premixing the polymer powder with the sulfuric acid. It has been determined in this connection that, with this sequence, the mixing between polymer powder and sulfuric acid becomes significantly more intensive. Only then is the already premixed product introduced into the reactor 1, where it is homogenized and devolatilized. Discharge is again through the discharging device 5, but it is also possible, as shown in FIG. 3, to utilize a single-shaft discharging apparatus 5.1 comprising a single-shaft discharging screw having a turning axle which extends axially parallel to an axis of the reactor and the screw is connected to one of the shafts.

What is claimed is:

1. A method of producing a spinning solution for producing a p-aramid fiber comprising admixing a polymer with a solvent to form a mixture, and thereafter melting, homogenizing, devolatilizing and then discharging the mixture, wherein the solvent is liquid sulfuric acid and the mixing, homogenizing and devolatilizing is effected in a continuously operated single or twin-shaft reactor.

2. The method according to claim 1, including admixing the polymer and the sulfuric acid under reduced pressure.

3. The method according to claim 1, wherein the sulfuric acid is premixed with the polymer in a mixer and then metered into the reactor.

4. The method according to claim 3, wherein solution enthalpy of the mixture is utilized for heating.

5. The method according to claim 1, wherein the reactor has a kneading zone and uniform devolatilizing is effected over the entire kneading zone length.

6. Apparatus for carrying out the process according to claim 1, wherein the reactor comprises an input stub for the mixture of polymer and sulfuric acid or two separate input stubs, each for one of the polymer and the sulfuric acid.

7. The apparatus according to claim 6, wherein the reactor is a twin-shaft reactor having corotating shafts.

8. The apparatus according to claim 7, including a mixer upstream of the reactor.

9. The apparatus according to claim 6, including a single or twin-shaft discharging device of variable speed of rotation downstream of the reactor.

10. The apparatus according to claim 7, wherein the reactor includes on its down stream side a single-shaft discharging screw having a turning axle which extends axially parallel to an axis of the reactor and the screw is connected to one of the shafts.

* * * * *